(12) United States Patent
Jolly et al.

(10) Patent No.: US 11,238,884 B2
(45) Date of Patent: Feb. 1, 2022

(54) SYSTEMS AND METHODS FOR RECORDING QUALITY DRIVEN COMMUNICATION MANAGEMENT

(71) Applicant: Red Box Recorders Limited, Nottinghamshire (GB)

(72) Inventors: Simon Jolly, Nottingham (GB); Tony Commander, Manchester (GB); Kyrylo Zotkin, Kyiv (UA)

(73) Assignee: RED BOX RECORDERS LIMITED, Nottinghamshire (GB)

( * ) Notice: Subject to any disclaimer, the term of this patent is extended or adjusted under 35 U.S.C. 154(b) by 134 days.

(21) Appl. No.: 16/593,461

(22) Filed: Oct. 4, 2019

(65) Prior Publication Data

US 2021/0104253 A1 Apr. 8, 2021

(51) Int. Cl.
| | |
|---|---|
| *G10L 21/0364* | (2013.01) |
| *H04L 29/06* | (2006.01) |
| *G10L 15/18* | (2013.01) |
| *G10L 25/60* | (2013.01) |
| *G10L 15/22* | (2006.01) |
| *G10L 15/08* | (2006.01) |

(52) U.S. Cl.
CPC .......... *G10L 21/0364* (2013.01); *G10L 15/18* (2013.01); *G10L 15/22* (2013.01); *G10L 25/60* (2013.01); *H04L 65/604* (2013.01); *G10L 2015/088* (2013.01)

(58) Field of Classification Search
CPC ................. G10L 21/0364; G10L 25/60; G10L 2015/088; H04L 65/604; H04L 65/605; H04L 65/1089; H04L 65/80

USPC .................................. 704/231–257, 270–275
See application file for complete search history.

(56) References Cited

U.S. PATENT DOCUMENTS

| | | | | |
|---|---|---|---|---|
| 8,682,660 | B1 * | 3/2014 | Lyudovyk | G10L 15/197 704/231 |
| 2002/0049593 | A1 * | 4/2002 | Shao | G10L 15/14 704/251 |
| 2004/0093194 | A1 * | 5/2004 | Singh | G10L 21/0208 703/2 |
| 2010/0312546 | A1 * | 12/2010 | Chang | G06N 20/00 704/9 |
| 2013/0018655 | A1 * | 1/2013 | Terrell, II | G10L 15/22 704/235 |

(Continued)

OTHER PUBLICATIONS

Speech to text transcription in 5 minutes, 85% accuracy; Advanced speech recognition software; "Transcript quality depends on audio quality Record clear audio to get accurate transcripts" Good Audio— Little background noise, Clear speaker(s), Minimal accents; Difficult Audio—Heavy background noise, Crosstalk, Strong accents https://www.temi.com.

*Primary Examiner* — Jesse S Pullias
(74) *Attorney, Agent, or Firm* — Katten Muchin Rosenman LLP (57) ABSTRACT

A system, method and non-transitory computer readable medium for providing call quality driven communication management wherein an audio data stream of a communication session having one or more utterances is processed to generate a transcript of the communication session. The generated transcript is analyzed to determine whether a quality of the audio data stream, and one or more quality improvement measures when one or more audio artifacts are determined to be present in the audio data stream.

17 Claims, 3 Drawing Sheets

(56) References Cited

U.S. PATENT DOCUMENTS

| | | | |
|---|---|---|---|
| 2013/0262110 A1* | 10/2013 | Xie | G10L 15/005 |
| | | | 704/235 |
| 2014/0195238 A1* | 7/2014 | Terao | G10L 15/063 |
| | | | 704/251 |
| 2015/0039306 A1* | 2/2015 | Sidi | G10L 15/12 |
| | | | 704/235 |
| 2015/0092575 A1* | 4/2015 | Khay-Ibbat | H04W 24/08 |
| | | | 370/252 |
| 2015/0095032 A1* | 4/2015 | Li | G10L 15/08 |
| | | | 704/255 |
| 2019/0066690 A1 | 2/2019 | Ziv et al. | |

* cited by examiner

SYSTEMS AND METHODS FOR RECORDING QUALITY DRIVEN COMMUNICATION MANAGEMENT

BACKGROUND OF THE INVENTION

Field of the Invention

This disclosure generally relates to systems and methods for improving the quality of call recordings.

Background

Businesses frequently employ call recording systems to monitor and later review or process business-related communication sessions. Call recording systems, for example, may be employed by stock exchanges or brokerages (or similar institutions) as part of a trading platform, where it is important to maintain a record of the transactions submitted through the system. As another example, customer service interactions (e.g., when a customer calls customer support) are commonly recorded and reviewed for quality assurance purposes. In facilitating the above, call recording systems will typically capture, or otherwise create, a digital reproduction of the business-related communication sessions (e.g., an audio reproduction of a telephone call). However, such communication sessions may be conducted across a number of different networks (e.g., PTSN, cellular, Internet, etc.), between any number of possible communication devices (e.g., landline telephones, cellular telephones, VoIP telephones, etc.), and in a variety of acoustical settings (e.g., a busy airport, an echoing hall way, etc.), all of which may affect the quality of the audio experienced by the participant and/or the quality of the audio record captured by the call recording system.

While audio quality remains a key factor in customer retention and satisfaction, traditional methods of resolving audio quality issues are inadequate. Traditional troubleshooting techniques focus on monitoring network health characteristics (e.g., packet loss, latency, jitter, echo, etc.), but identifying the problem itself can require a significant commitment of resources (time and personnel). Furthermore, it is frequently the case that the issue(s) go unresolved due to the complexity of the issue(s) being faced, the difficulty in properly diagnosing the issue(s), and the inability to recommend a satisfactory and cost-efficient fix.

BRIEF SUMMARY

The presently disclosed call monitoring system seeks to address the above-mentioned limitations of existing call monitoring techniques by analyzing an auto-generated transcript of a captured call, and leveraging this analysis to identify and mitigate those issues affecting the quality of the call and/or the captured recording.

BRIEF DESCRIPTION OF THE DRAWINGS

The accompanying drawings, which are incorporated herein and form part of the specification, illustrate one or more aspects of the present invention and, together with the description, further serve to explain the principles of the invention and to enable a person skilled in the relevant art(s) to make and use the invention.

The features and advantages of the disclosed embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. Unless otherwise indicated, the drawings provided throughout the disclosure should not necessarily be interpreted as to-scale drawings.

DETAILED DESCRIPTION

Figure 1:
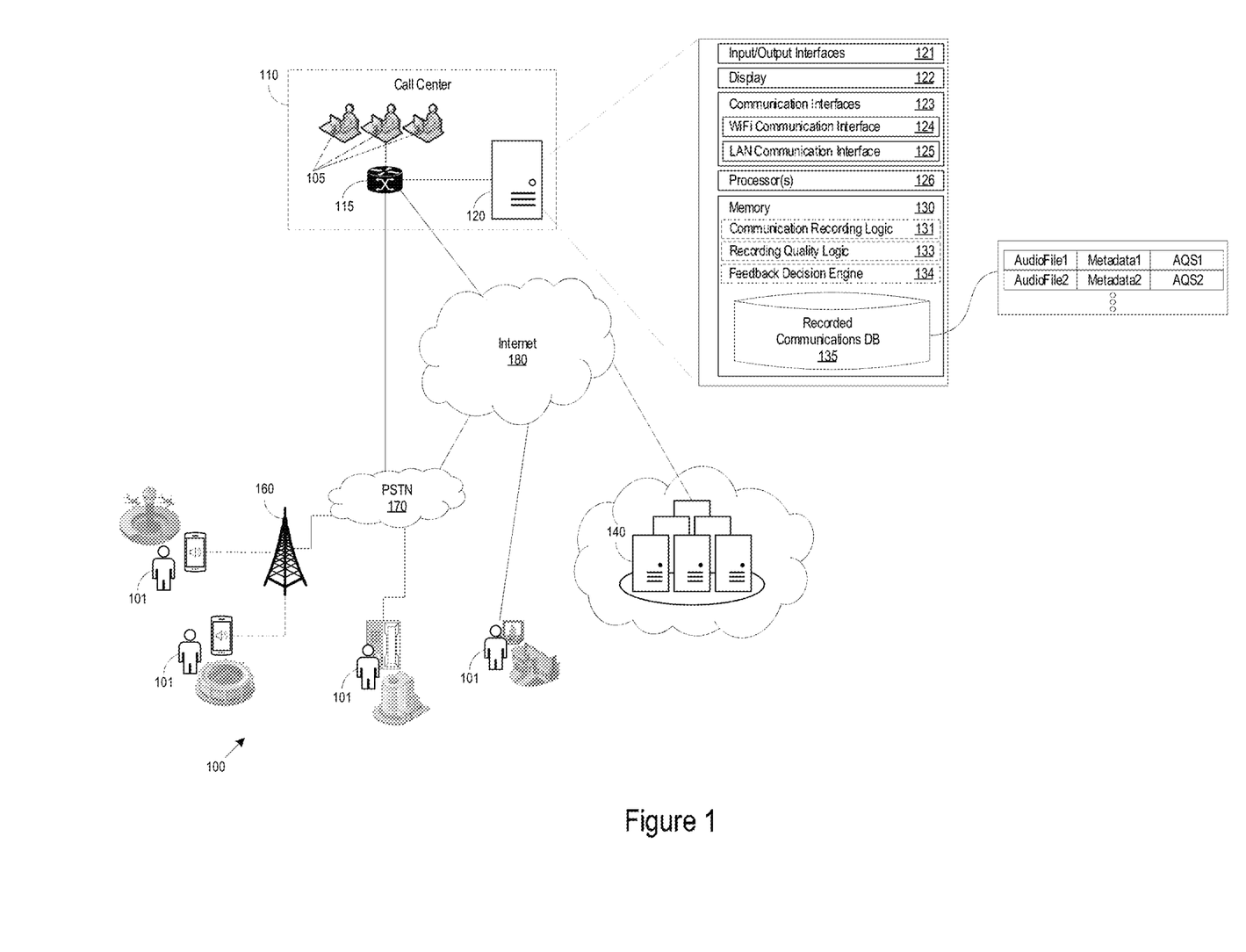
FIG. 1 illustrates an exemplary environment in which the call monitoring techniques of the present invention may be used.

FIG. 1 illustrates an exemplary environment 100 in which the present invention may be deployed to facilitate call monitoring functionality with respect to communication sessions held between customer service agents 105 at an enterprise call center 110 and enterprise customers 101.

More particularly, an enterprise customer 101 may initiate a communication session with a customer service agent 105 (e.g., by calling a customer support telephone number), or a customer service agent 105 (or the call monitoring system 120) may initiate a communication session with customer 101 (e.g., calling a customer 101 at a specified time, or once they reach the front of a queues). Customers 101 and agents 105 may use a number of different terminal devices (e.g., landline telephones, cellular telephones, VoIP telephones, etc.) to conduct such communication sessions, with data traversing one or more different networks over which the terminal devices may communicate. As illustrated, for example, communications between customers 101 and agents 105 may take place over cellular network 160, public switched telephone network (PSTN) 170, the Internet 180, or some combination thereof. For ease of illustration, the networks in FIG. 1 are depicted broadly, but it should be appreciated that each of the networks themselves may be composed of different nodes or devices that operate together as the illustrated networks.

The call center 110 may include a communications management device 115 placed at the edge of the call center network to route communications to and from the appropriate agent 105, as well as the call monitoring system 120. The communications management device 115, for example, may transmit and receive audio data streams to and from the terminal devices of customers 101. Similarly, the communications management device 115 may transmit and receive audio data streams to and from the terminal devices of agents 105. The communications management device 115 may also be capable of affecting various changes in the communication sessions, for example, adjusting how communication sessions should be routed (internally and externally), or affecting changes in how the communication sessions are being conducted (e.g., instructing terminal devices to change the codec being used for the communication session). The call center 110 may also include a call monitoring system 120 for recording communication sessions, analyzing captured communications sessions to identify audio quality issues, and initiating troubleshooting measures to address the identified audio quality issues. In some embodiments, the call monitoring system 120 may be deployed on premises at the call center 110 (as illustrated), while in others, the call monitoring system 120 may be remotely located (e.g., at a cloud data center), in which case the communication data may be routed across one or more different networks (e.g., the Internet 180). Likewise, in some embodiments, the communications management device 115 may be integrated with the call monitoring system 120, while in others it may exist independently (as illustrated).

The environment 100 may also include one or more cloud servers 140, with which the call monitoring systems 120 may interface, for example, offloading compute and/or storage tasks. Cloud servers 140, for example, may perform some of the functionality described below with respect to the call monitoring system 120 (e.g., calculating an audio quality score, providing audio transcription services, etc.), which call monitoring systems 120 may invoke through an outward facing service (e.g., a SOAP or REST web service). In other embodiments, cloud servers 140 may host the recorded communications database 135, or some other database. For ease of illustration, the cloud servers 140 in FIG. 1 are depicted broadly, but it should be appreciated that each cloud server 140 itself may be composed of different elements. The cloud servers 140, for example and without limitation, may include one or more input/output interfaces, a display, communication interfaces (e.g., WiFi communication interface, and LAN communication interface), memory, processors, and the like.

The call monitoring system 120 may include one or more input/output interfaces 121, a display 122, communication interfaces 123 (e.g., WiFi communication interface 124, and LAN communication interface 125), processors 126, and memory 130. The memory 130 may include communication recording logic 131, recording quality logic 133, and a feedback decision engine 134, along with a recorded communications database 135, which the processor(s) 126 may utilize to provide different system functionality.

The communication recording logic 131, for instance, may allow the call monitoring system 120 to capture communication sessions as well as manage communication sessions that were previously captured. More particularly, call monitoring system 120 may receive one or more audio data streams from communications management device 115 corresponding to a communications session being held between a customer 101 and agent 105. The call monitoring system 120 may automatically, or upon direction of the agent 105, capture the audio data streams as an audio file, which may be written to the memory 130 of the call monitoring system 120 (e.g., in recorded communications database 135). The call monitoring system 120 may also store metadata associated with the communication sessions, including for example, the location from which the audio data stream originated, the device (and device settings) used to create the audio data stream, and details regarding the network connection over which it was received.

The call monitoring system 120, likewise, may utilize call quality logic 133 to assess the quality of a communications session. As noted earlier, a number of technological and environmental factors may influence the quality of a communications session, and consequently the audio streams received by the communications management device 115 from customers 101 and agents 105, as well as the audio stream ultimately captured by the call monitoring system 120. The terminal devices of end customers, for instance, may have distinct audio capture and processing capabilities (e.g., based on a microphone's frequency response, the audio codecs supported by the device, etc.). The communication networks across which the communication sessions are held may similarly impact the quality of the call (e.g., noise introduced by the transmission medium used, or packet loss experienced by the network). The customers' environment may also significantly affect call quality, for example, where a customer's voice is masked (e.g., at a busy airport or loud stadium), or where the customer's voice is muted (e.g., whispering in a public forum), or otherwise diminished, or where an echo is experienced (e.g., in a parking garage). These technological and environmental factors may introduce various acoustical artifacts that may affect the intelligibility of the spoken communications, which the call monitoring system 120 may identify using call quality logic 133.

More particularly, the acoustical artifacts affecting the intelligibility of the spoke communication may also impact the ability to transcribe the audio file using traditional speech-to-text conversion techniques, and so by analyzing an automatically generated transcript, the call monitoring system 120 may be able to identify audio quality issues in the spoken communication and/or captured audio itself. Accordingly, the call monitoring system 120 may first obtain an automated transcription of the recorded communication session, which may include candidate text for each utterance (i.e., discrete speech segment) in the audio stream. In some embodiments, the transcription may also include a confidence measure for each utterance, indicating the probability that the candidate text accurately reflects the spoken word. In some embodiments, the transcription may be performed locally by the call monitoring system 120 itself, while in other embodiments, the transcription may be performed remotely. For example, a cloud server 140 (e.g., in an enterprise data center) may provide for transcription as a service, and in such cases, the call monitoring system 120 may transmit the audio file for the communications session to the remote server 140 for transcription, and receive the transcript in response.

The call monitoring system 120, or cloud server 140, may also apply natural language processing techniques to further enhance the transcription. For example, one or more natural language rules may be applied to the transcript to determine whether the identified candidate text is contextually accurate. When the natural language rules are met (i.e., the candidate text fits an expected semantic or grammatical pattern), the confidence measure for the candidate text may be adjusted accordingly. The call monitoring system 120 (or remote server), for example, may be able to determine a call and response pattern to the speech which may fit an expected pattern (e.g., "What is your name?" and "My name is Steve"). The call monitoring system 120 (or remote server) may also look to see whether certain keywords are present in the transcript, and may similarly adjust the confidence measure in response. For example, in the call center context, the call monitoring system 120 (or remote server) may look for words like "Welcome," "Company X," and "help," which would expect to be spoken on a support call (e.g., "Welcome to Company X, my name is John, how may I help you?"). The call monitoring system 120 (or remote server) may also look to identify certain words that would be expected at a particular stage of a communications session (e.g., greetings, salutations, or introductions at the beginning of a conference call).

Ultimately, the call monitoring system 120 may calculate an audio quality score based on the transcript. The call monitoring system 120, for example, may perform a weighted combination of different factors to arrive at an audio quality score, including one or more of the confidence measures generated during transcription, the identification of certain keywords, the satisfaction of different natural language rules, the ratio of utterances to duration. The call monitoring system 120, for example, may tag candidate text meeting certain criteria (e.g., a specified threshold) as being recognized, while tagging those that do not meet the criteria as being unrecognized (or an "escape"). The call monitoring system 120 may then calculate a ratio of the recognized candidate text to the unrecognized candidate text as the audio quality score. The call monitoring system 120 may also attribute a descriptive characterization to the audio quality score (e.g., poor quality, low quality, adequate quality, high quality) based on the score exceeding a particular threshold or falling within a particular range of values. The call monitoring system 120 may store the audio quality score in the record communications database 135 in association with the captured audio file and associated metadata.

Upon identification of an audio quality issue (i.e., where the quality score is below a particular threshold), the call monitoring system 120 may utilize feedback decision engine 134 to identify what, if any, corrective actions or troubleshooting measures can be taken. Based on the quality score, for example, the call monitoring system 120 may send an e-mail or alert, invoke an API service (e.g., a notification service), trigger an SNMP trap, or display or otherwise update a administrator dashboard. In some embodiments, the call monitoring system 120 may automatically instruct the terminal devices of the agents 105 and/or customers 101 to utilize an alternative codec, or instruct the communications management device 115 to route the communications session differently, or use a different media type.

Figure 2:
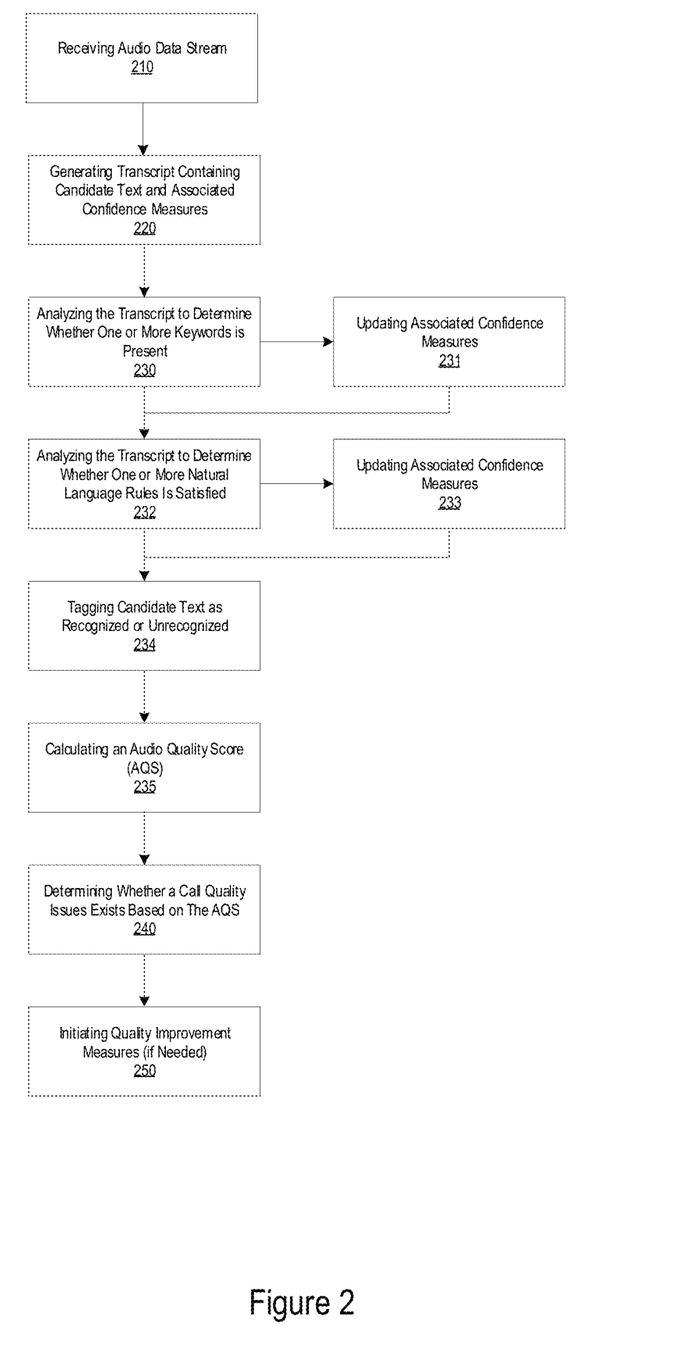
FIG. 2 depicts a high-level logic flow that the call monitoring system may follow in identifying and mitigating call quality issues.

FIG. 2 depicts a high-level logic flow that the call monitoring system 120 may follow when analyzing audio data streams to identify call quality issues. The process may begin with the call monitoring system 120 receiving an audio data stream representing a communication session, or a portion thereof, for processing (210). The audio data stream may be received from the communications management device 115 as part of an active communication session, or may have been previously captured, and retrieved from the recorded communications database 135. A transcript of the audio data stream may then be generated that includes candidate text for each utterance (i.e., speech segment) in the audio data stream along with associated confidence measures, which may be represented as a single value (e.g., a percentage certainty) or as a statistical distribution (220). The transcript that is generated may then be analyzed to determine a quality of the audio data stream, for example, by tagging each candidate text having a confidence measure above a certain threshold as being "recognized" and tagging those falling below the threshold as being "unrecognized" (234) and calculating the ratio of recognized to unrecognized text as the audio quality score (AQS). (235) Analyzing the transcript may additionally involve determining whether one or more keywords is present or absent from the transcript (230), or determining whether one or more natural language rules are satisfied (232) and updating the associated confidence measures accordingly (231, 233). Based on the AQS, the call monitoring system 120 may be able to determine (e.g., by checking whether the AQS exceeds a particular threshold or reference value) whether any call quality issues exist (240), and may take or initiate certain measures to attempt to address such issues (250). In some embodiments, the system administrator may specify the threshold value against which the calculated AQS may be compared, while in others, a baseline or reference value may be used.

Figure 3:
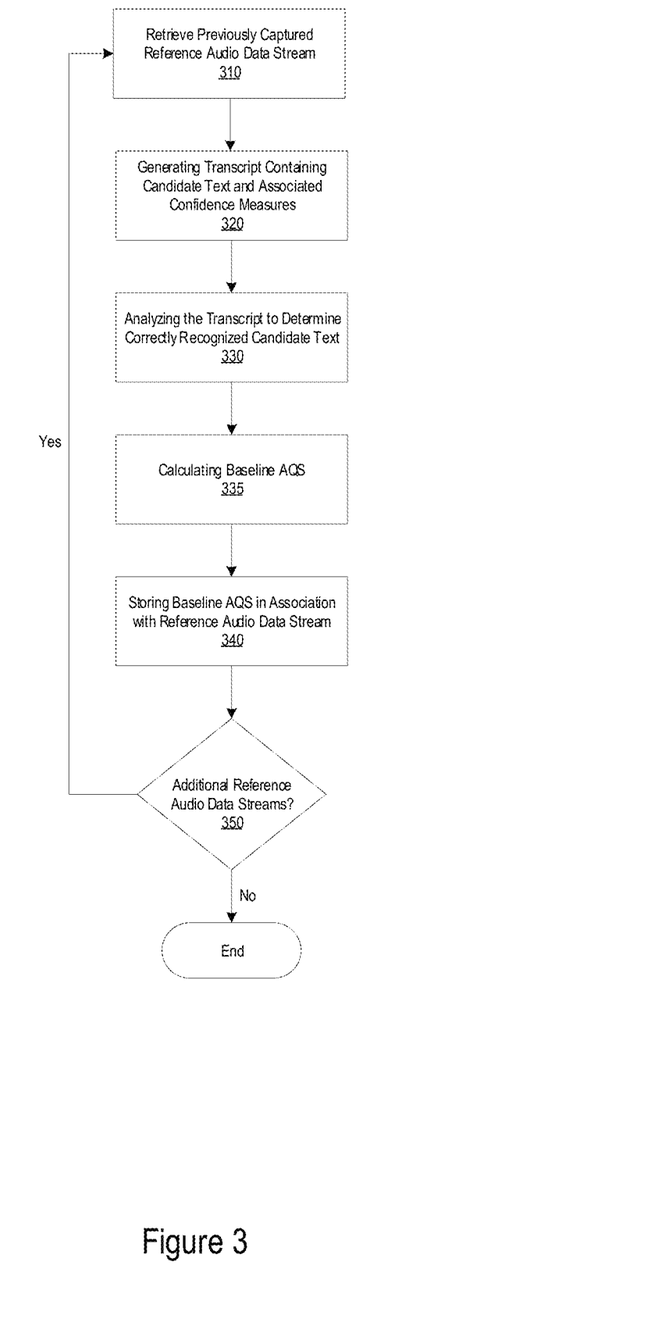
FIG. 3 depicts an exemplary logic flow that the call monitoring system may employ when determining whether a call quality issue exists.

The call monitoring system 120, for example, may employ a process similar to that of FIG. 2 to establish an audio quality baseline. As illustrated in FIG. 3, the call monitoring system 120 may retrieve a reference audio stream that was previously captured (310), for example, from recorded communications database 135 in memory 130. The call monitoring system 120 may then process the previously captured audio data stream to generate a transcription of the audio data stream, consisting of candidate text for each utterance in the reference audio stream along with associated confidence values (320). The call monitoring system 120 may analyze the transcript to identify the candidate text that had been correctly recognized (330), and may calculate the quality baseline as the ratio of recognized to unrecognized candidate text (335). The baseline audio quality score may be stored by the call monitoring system 120 in association with the reference audio stream (340). Using a single baseline audio quality score may not always be appropriate—for example, a baseline audio quality score derived from a local call made using a landline telephone may not be meaningful when applied to a transoceanic call made using a satellite phone. Accordingly, in some embodiments, the above-described steps may be repeated for multiple reference audio streams, such that a baseline audio quality index is created (350). In yet other embodiments, an optimal, or ideal, audio stream may be synthesized by the call monitoring system 120, which may then be used as the reference audio stream—having an ideal or optimal audio quality score—against which other audio data streams may be evaluated.

While specific embodiments of the invention have been described above, it will be appreciated that the invention may be practiced other than as described. The embodiment(s) described, and references in the specification to "one embodiment," "an embodiment," "an example embodiment," "some embodiments," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

The description provided above is intended to be illustrative and non-limiting. Thus, it will be apparent to one skilled in the art that modifications may be made to the present invention as described without departing from the scope of the claims set out below. For instance, while the above description was provided within the context of a call center's operation, the invention is not thus limited, and may be naturally extended to other contexts. The call monitoring system, for example, may be used to identify and address audio quality issues experienced during normal voice calls or conference calls, or used alongside voicemail and other call recording systems.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed:

1. A method comprising:
receiving an audio data stream of at least a portion of a communication session, the audio data stream comprising one or more utterances;
processing the audio data stream to generate a transcript of the communication session, the transcript comprising candidate text for each utterance in the audio data stream along with confidence measures;
analyzing the candidate text and confidence measures to determine a quality of the audio data stream, wherein analyzing the transcript comprises:
tagging, as recognized text, each candidate text having a confidence measure meeting certain criteria, and tagging, as unrecognized text, each candidate text having a confidence measure that fails to meet the certain criteria; and
calculating an audio quality score based on the ratio of recognized text to unrecognized text; and
initiating one or more quality improvement measures when the audio quality score indicates that one or more audio artifacts are present in the audio data stream; and
establishing an audio quality baseline by:
retrieving a previously captured audio data stream of a previous communications session, the previously captured audio data stream comprising one or more previous utterances;
processing the previously captured audio data stream to generate another transcript of the previous communication session, the another transcript comprising additional candidate text for each previous utterance in the previously captured audio data stream along with additional confidence measures;
calculating an average confidence measure for the additional candidate text as the audio quality baseline;
storing the audio quality baseline in association with the previously captured audio data stream; and
comparing the audio quality score to the audio quality baseline to determine whether the audio quality score indicates that one or more audio artifacts are present in the audio data stream.

2. The method of claim 1, wherein analyzing the transcript further comprises:
determining whether one or more natural language rules are satisfied; and
based on a determination that a particular language rule is satisfied, updating the confidence measure for each utterance associated with the particular rule.

3. The method of claim 2, wherein analyzing the transcript further comprises:
detecting whether one or more keywords are present in the transcript; and
updating the confidence measure for each utterance of the one or more keywords.

4. The method of claim 1 wherein the one or more quality improvement measures include modifying the transmission codec, altering network routing, and/or modifying transmission media type.

5. A call monitoring system comprising:
a non-transitory storage medium having a plurality of instructions stored thereon; and
at least one processor configure to execute the instructions to:
receive an audio data stream of at least a portion of a communication session, the audio data stream comprising one or more utterances;
process the audio data stream to generate a transcript of the communication session, the transcript comprising candidate text for each utterance in the audio data stream along with confidence measures;
analyze the candidate text and confidence measures to determine a quality of the audio data stream, wherein the processor is configured to execute the instructions to:
tag, as recognized text, each candidate text having a confidence measure meeting certain criteria, and tag, as unrecognized text, each candidate text having a confidence measure that fails to meet the certain criteria; and
calculate an audio quality score based on the ratio of recognized text to unrecognized text; and
initiate one or more quality improvement measures when the audio quality score indicates that one or more audio artifacts are present in the audio data stream; and
establish an audio quality baseline by:
retrieving a previously captured audio data stream of a previous communications session, the previously captured audio data stream comprising one or more previous utterances;
processing the previously captured audio data stream to generate another transcript of the previous communication session, the another transcript comprising additional candidate text for each previous utterance in the previously captured audio data stream along with additional confidence measures;
calculating an average confidence measure for the additional candidate text as the audio quality baseline;
storing the audio quality baseline in association with the previously captured audio data stream; and
compare the audio quality score to the audio quality baseline to determine whether the audio quality score indicates that one or more audio artifacts are present in the audio data stream.

6. The call monitoring system of claim 5, wherein the processor is configured to execute the instructions to:
determine whether one or more natural language rules are satisfied; and
based on a determination that a particular language rule is satisfied, update the confidence measure for each utterance associated with the particular rule.

7. The call monitoring system of claim 6, wherein the processor is configured to execute the instructions to:
detect whether one or more keywords are present in the transcript; and
update the confidence measure for each utterance of the one or more keywords.

8. The call monitoring system of claim 5, wherein the one or more quality improvement measures include modifying the transmission codec, altering network routing, and/or modifying transmission media type.

9. A non-transitory computer-readable medium comprising a plurality of instructions, the instructions being executable by a processor to:
receive an audio data stream of at least a portion of a communication session, the audio data stream comprising one or more utterances;

process the audio data stream to generate a transcript of the communication session, the transcript comprising candidate text for each utterance in the audio data stream along with confidence measures;

analyze the candidate text and confidence measures to determine a quality of the audio data stream, wherein the processor is configured to execute the instructions to:

tag, as recognized text, each candidate text having a confidence measure meeting certain criteria, and tag, as unrecognized text, each candidate text having a confidence measure that fails to meet the certain criteria; and calculate an audio quality score based on the ratio of recognized text to unrecognized text; and initiate one or more quality improvement measures when the audio quality score indicates that one or more audio artifacts are present in the audio data stream; and establish an audio quality baseline by:
retrieving a previously captured audio data stream of a previous communications session, the previously captured audio data stream comprising one or more previous utterances;

processing the previously captured audio data stream to generate another transcript of the previous communication session, the another transcript comprising additional candidate text for each previous utterance in the previously captured audio data stream along with additional confidence measures;

calculating an average confidence measure for the additional candidate text as the audio quality baseline;

storing the audio quality baseline in association with the previously captured audio data stream; and comparing the audio quality score to the audio quality baseline to determine whether the audio quality score indicates that one or more audio artifacts are present in the audio data stream.

10. The non-transitory computer-readable medium of claim 9, wherein the instructions are further executable by the processor to:
determine whether one or more natural language rules are satisfied; and
based on a determination that a particular language rule is satisfied, update the confidence measure for each utterance associated with the particular rule.

11. The non-transitory computer-readable medium of claim 10, wherein the instructions are further executable by the processor to:
detect whether one or more keywords are present in the transcript; and
update the confidence measure for each utterance of the one or more keywords.

12. A method comprising:
receiving an audio data stream of at least a portion of a communication session, the audio data stream comprising one or more utterances;
processing the audio data stream to generate a transcript of the communication session, the transcript comprising candidate text for each utterance in the audio data stream along with confidence measures;
analyzing the candidate text and confidence measures to determine a quality of the audio data stream, wherein analyzing the transcript comprises:
tagging, as recognized text, each candidate text having a confidence measure meeting certain criteria, and tagging, as unrecognized text, each candidate text having a confidence measure that fails to meet the certain criteria; and
calculating an audio quality score based on the ratio of recognized text to unrecognized text; and
initiating one or more quality improvement measures when the audio quality score indicates that one or more audio artifacts are present in the audio data stream; and
establishing a baseline audio quality index by:
retrieving a plurality of previously captured audio data streams and corresponding metadata, the previously captured audio data streams each comprising one or more previous utterances;
processing each previously captured audio data stream to generate additional transcripts, the additional transcripts comprising additional candidate text along with additional confidence measures;
calculating a plurality of baseline audio quality scores as the average confidence measure the additional candidate text in each additional transcript; and
storing the plurality of baseline audio quality scores in association with the corresponding metadata;
selecting a particular baseline audio quality score from the baseline audio quality index based on a metadata of the audio stream; and
comparing the audio quality score to the particular baseline audio quality score to determine whether the audio quality score indicates that one or more audio artifacts are present in the audio data stream.

13. A method comprising:
receiving an audio data stream of at least a portion of a communication session, the audio data stream comprising one or more utterances;
processing the audio data stream to generate a transcript of the communication session, the transcript comprising candidate text for each utterance in the audio data stream along with confidence measures;
analyzing the candidate text and confidence measures to determine a quality of the audio data stream, wherein analyzing the transcript comprises:
tagging, as recognized text, each candidate text having a confidence measure meeting certain criteria, and tagging, as unrecognized text, each candidate text having a confidence measure that fails to meet the certain criteria; and
calculating an audio quality score based on the ratio of recognized text to unrecognized text; and
initiating one or more quality improvement measures when the audio quality score indicates that one or more audio artifacts are present in the audio data stream; and
establishing an audio quality baseline by:
synthesizing an ideal audio data stream free of any audio quality artifacts, the ideal audio data stream comprising one or more clear utterances;
processing the ideal audio data stream to generate another transcript, the another transcript comprising additional candidate text for each clear utterance in the ideal audio data stream along with additional confidence measures;
calculating an average confidence measure for the additional candidate text as the audio quality baseline; and
comparing the audio quality score to the audio quality baseline to determine whether the audio quality score indicates that one or more audio artifacts are present in the audio data stream.

14. A call monitoring system comprising:
a non-transitory storage medium having a plurality of instructions stored thereon; and
at least one processor configure to execute the instructions to:
receive an audio data stream of at least a portion of a communication session, the audio data stream comprising one or more utterances;
process the audio data stream to generate a transcript of the communication session, the transcript comprising candidate text for each utterance in the audio data stream along with confidence measures;
analyze the candidate text and confidence measures to determine a quality of the audio data stream, wherein the processor is configured to execute the instructions to:
tag, as recognized text, each candidate text having a confidence measure meeting certain criteria, and tag, as unrecognized text, each candidate text having a confidence measure that fails to meet the certain criteria; and
calculate an audio quality score based on the ratio of recognized text to unrecognized text; and
initiate one or more quality improvement measures when the audio quality score indicates that one or more audio artifacts are present in the audio data stream; and
establish a baseline audio quality index by:
retrieving a plurality of previously captured audio data streams and corresponding metadata, the previously captured audio data streams each comprising one or more previous utterances;
processing each previously captured audio data stream to generate additional transcripts, the additional transcripts comprising additional candidate text along with additional confidence measures;
calculating a plurality of baseline audio quality scores as the average confidence measure the additional candidate text in each additional transcript; and
storing the plurality of baseline audio quality scores in association with the corresponding metadata;
select a particular baseline audio quality score from the baseline audio quality index based on a metadata of the audio stream; and
compare the audio quality score to the particular baseline audio quality score to determine whether the audio quality score indicates that one or more audio artifacts are present in the audio data stream.

15. A call monitoring system comprising:
a non-transitory storage medium having a plurality of instructions stored thereon; and
at least one processor configure to execute the instructions to:
receive an audio data stream of at least a portion of a communication session, the audio data stream comprising one or more utterances;
process the audio data stream to generate a transcript of the communication session, the transcript comprising candidate text for each utterance in the audio data stream along with confidence measures;
analyze the candidate text and confidence measures to determine a quality of the audio data stream, wherein the processor is configured to execute the instructions to:
tag, as recognized text, each candidate text having a confidence measure meeting certain criteria, and tag, as unrecognized text, each candidate text having a confidence measure that fails to meet the certain criteria; and
calculate an audio quality score based on the ratio of recognized text to unrecognized text; and
initiate one or more quality improvement measures when the audio quality score indicates that one or more audio artifacts are present in the audio data stream; and
establish an audio quality baseline by:
synthesizing an ideal audio data stream free of any audio quality artifacts, the ideal audio data stream comprising one or more clear utterances;
processing the ideal audio data stream to generate another transcript, the another transcript comprising additional candidate text for each clear utterance in the ideal audio data stream along with additional confidence measures; and
calculating an average confidence measure for the additional candidate text as the audio quality baseline; and
compare the audio quality score to the audio quality baseline to determine whether the audio quality score indicates that one or more audio artifacts are present in the audio data stream.

16. A non-transitory computer-readable medium comprising a plurality of instructions, the instructions being executable by a processor to:
receive an audio data stream of at least a portion of a communication session, the audio data stream comprising one or more utterances;
process the audio data stream to generate a transcript of the communication session, the transcript comprising candidate text for each utterance in the audio data stream along with confidence measures;
analyze the candidate text and confidence measures to determine a quality of the audio data stream, wherein the processor is configured to execute the instructions to:
tag, as recognized text, each candidate text having a confidence measure meeting certain criteria, and tag, as unrecognized text, each candidate text having a confidence measure that fails to meet the certain criteria; and
calculate an audio quality score based on the ratio of recognized text to unrecognized text; and
initiate one or more quality improvement measures when the audio quality score indicates that one or more audio artifacts are present in the audio data stream; and
establish a baseline audio quality index by:
retrieving a plurality of previously captured audio data streams and corresponding metadata, the previously captured audio data streams each comprising one or more previous utterances;
processing each previously captured audio data stream to generate additional transcripts, the additional transcripts comprising additional candidate text along with additional confidence measures;
calculating a plurality of baseline audio quality scores as the average confidence measure the additional candidate text in each additional transcript; and
storing the plurality of baseline audio quality scores in association with the corresponding metadata;
select a particular baseline audio quality score from the baseline audio quality index based on a metadata of the audio stream; and
compare the audio quality score to the particular baseline audio quality score to determine whether the audio quality score indicates that one or more audio artifacts are present in the audio data stream.

17. A non-transitory computer-readable medium comprising a plurality of instructions, the instructions being executable by a processor to:
- receive an audio data stream of at least a portion of a communication session, the audio data stream comprising one or more utterances;
- process the audio data stream to generate a transcript of the communication session, the transcript comprising candidate text for each utterance in the audio data stream along with confidence measures;
- analyze the candidate text and confidence measures to determine a quality of the audio data stream, wherein the processor is configured to execute the instructions to:
  - tag, as recognized text, each candidate text having a confidence measure meeting certain criteria, and tag, as unrecognized text, each candidate text having a confidence measure that fails to meet the certain criteria; and
  - calculate an audio quality score based on the ratio of recognized text to unrecognized text; and
- initiate one or more quality improvement measures when the audio quality score indicates that one or more audio artifacts are present in the audio data stream; and
- establish an audio quality baseline by:
  - synthesizing an ideal audio data stream free of any audio quality artifacts, the ideal audio data stream comprising one or more clear utterances;
  - processing the ideal audio data stream to generate another transcript, the another transcript comprising additional candidate text for each clear utterance in the ideal audio data stream along with additional confidence measures; and
  - calculating an average confidence measure for the additional candidate text as the audio quality baseline; and
- compare the audio quality score to the audio quality baseline to determine whether the audio quality score indicates that one or more audio artifacts are present in the audio data stream.

* * * * *